Patented Sept. 7, 1943

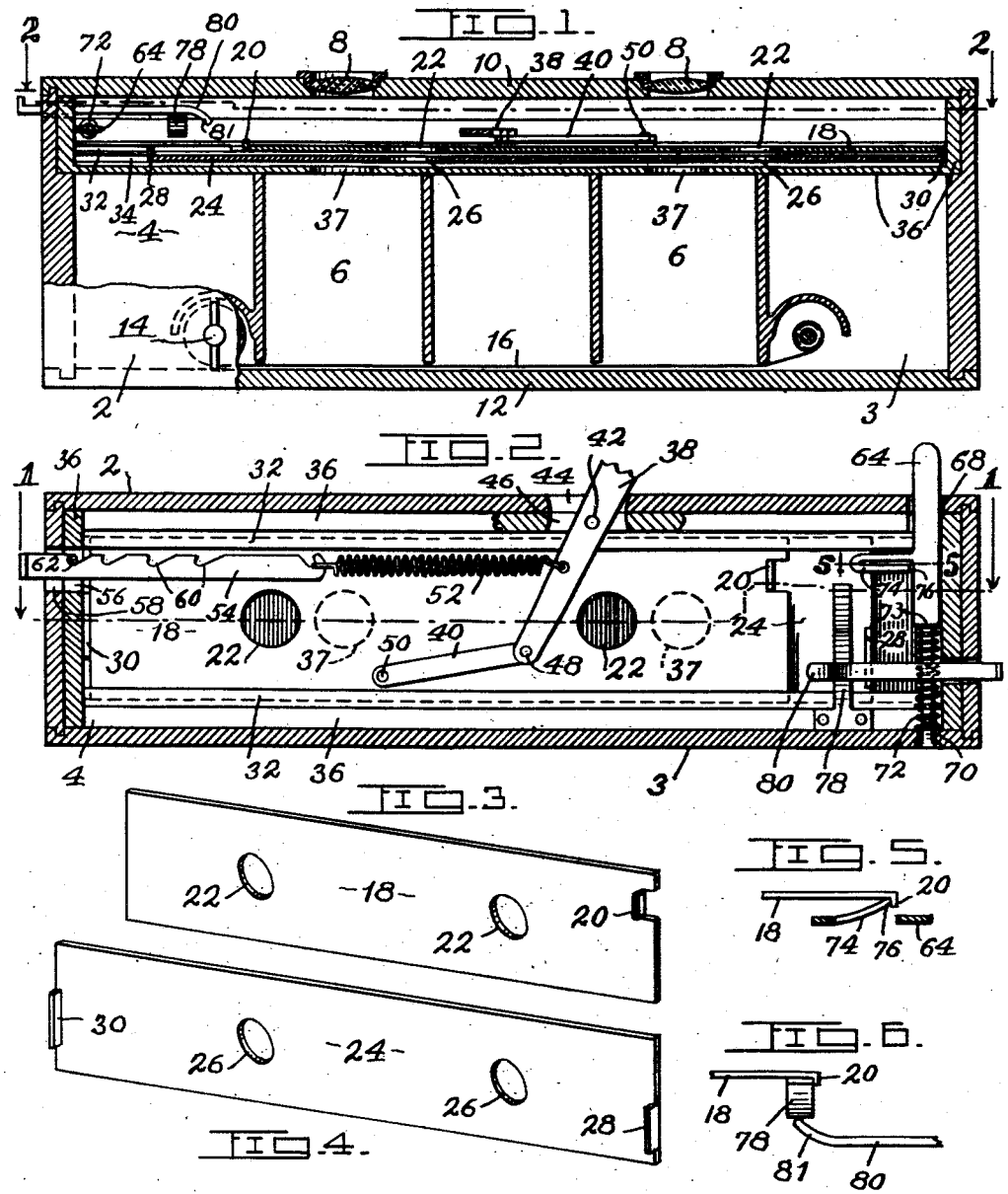

2,328,677

UNITED STATES PATENT OFFICE 2,328,677

STEREOSCOPIC CAMERA

Arthur Ringer and Orrin C. Lowe, Paola, Kans.; said Lowe assignor to said Ringer Application December 8, 1941, Serial No. 422,044

11 Claims. (Cl. 95—18)

Our invention relates to stereoscopic cameras and the present invention relates more particularly to the shutters of the camera and mechanism whereby they may be conveniently and positively controlled to obtain either instantaneous, or time exposures of a sensitive film movably mounted in the camera.

One object of the invention is the provision of simple and inexpensive shutters with adjustable controlling means therefor whereby so-called instantaneous exposures of various lengths can be accurately obtained.

Another object is the provision of shutters and controlling means therefor whereby time exposures of various lengths can be had.

A further object is the provision of shutters and controlling means therefor whereby the exposure through both lenses will begin at the same instant and terminate at the same instant, so that the duration of exposure through both lenses will be exactly the same.

Another object is the provision of shutters and controlling means therefor which are durable in construction and reliable in operation.

Other objects will hereinafter appear and in order that the invention may be fully understood, reference will now be had to the accompanying drawing, in which:

Fig. 1 is a horizontal sectional view on line 1—1 of Fig. 2, showing a stereoscopic camera equipped with our improvements.

Fig. 2 is a vertical longitudinal section on line 2—2 of Fig. 1.

Fig. 3 is a detail perspective view of a primary shutter blade.

Fig. 4 is a detail perspective view of a secondary shutter blade.

Fig. 5 is a detail section on line 5—5 of Fig. 2, with the primary blade held at the end of an advance movement preparatory to either an instantaneous or time exposure of the film.

Fig. 6 is a broken detail plan view of means for intercepting and holding the primary blade for a time exposure of the film.

Referring in detail to the different parts, 2 designates a stereoscopic camera comprising a casing 3 having a dark box 4 two dark compartments 6 and a pair of spaced lenses 8. The lenses 8 are mounted in the front wall 10 of the casing which is preferably removable so that access may be had to the shutter mechanism and controlling means therefor. The rear wall 12 of the dark box is also removable so that sensitive films may be placed in position for exposure in the focus of the lenses, and removed from the dark box after exposure. A conventional key 14 is provided for winding a sensitive film 16 in the usual manner upon a spool to advance the film across the open rear ends of the dark compartments 6 after each exposure.

Referring now more particularly to the shutter mechanism forming an important feature of the present invention, 18 designates a primary blade, comprising a plate made of sheet metal or other suitable material and provided at its forward end with a lug 20 for a purpose which will hereinafter appear. The primary blade 18 is also provided with a pair of apertures 22 spaced to register with the lenses 8.

The primary blade 18 is adapted to cooperate with a secondary blade 24 provided with a pair of apertures 26 spaced to register with the lenses 8 and the apertures 22. The secondary blade 24 is of substantially the same form as the primary blade excepting that it is somewhat longer and provided at its front and rear ends with flanges 28 and 30, respectively, for alternate engagement by the primary shutter, as will hereinafter appear. The blades 18 and 24 are slidably mounted one in front of the other in grooved tracks 32 and 34 fixed to the upper and lower portions, respectively, of a frame 36 suitably secured in front of the dark box 4 and provided with a pair of apertures 37 spaced to register with the lenses 8 and the apertures 22 and 26 of the blades 18 and 24, respectively.

The primary blade 18 is adapted to be advanced from normal position by a manual lever 38 and a link 40. The lever 38 is fulcrumed upon a pivot 42 and extends upward through registering slots 44 and 46 in frame 36 and the upper wall of the casing 3, respectively, so that its upper end will be accessible to the operator. The link 40 is connected at its ends to the lower end of lever 38 and the primary blade 18 by pivots 48 and 50, respectively.

The lever 38 is normally held in the position disclosed by Fig. 2, by means of a retractile spring 52 connected at one end to said lever and at its opposite end to a tensioning bar 54 extending outwardly through registering slots 56 and 58 in adjacent ends of the frame 36 and the casing 3, respectively, so that its outer end may be grasped when it is desired to adjust the bar outward or inward to change the tension of spring 52 for the purpose of increasing or decreasing the speed of the blades 18 and 24. The bar 54 is provided with a series of notches 60 for selective engagement with a pin 62 to hold the bar at any point of its adjustment. The pin 62 extends transversely through slot 56 in the frame 36.

Referring now more particularly to the means for holding the primary blade 18 in advanced position preparatory to exposure of the sensitive film, 64 designates a vertically movable manual member slidably mounted at its upper and lower portions in slots 68 and 70 formed in the top and bottom, respectively, of the casing 3 and normally held in raised position by an extension spring 72 interposed between a shoulder 73 of the member 64 and the lower wall of the casing. The member 64 is provided with a resilient arm 74 having a free end 76 which projects into the path of the lug 20 to automatically engage the same and hold the primary blade stationary as it reaches the end of its advance movement preparatory to making either an instantaneous exposure or a time exposure of the film.

Referring now more particularly to means for cooperating with the member 64 to effect a time exposure of the film, 78 designates an upright spring member secured at its lower end to the frame 36 and terminating at its upper end on a level with the lug 20 at the front end of the primary shutter 18. The upper end of the spring member 78 is adapted to be forced into the path of the lug 20 by means of a presser-arm 80 which extends outwardly through registering slots in the adjacent ends of the frame 36 and dark box 4, respectively, so that its outer end may be grasped by the operator.

In practice the primary and secondary blades 18 and 24, respectively, are normally positioned adjacent to one side of the dark box 4, as shown by Figs. 1 and 2, with the rear end of the blade 18 abutting the flange 30 of the blade 24, and the apertures 22 and 26 registering with each other, but out of registry with the lenses 8 and the apertures 37. When it is desired to make an instantaneous exposure of the film the lever 38 is manually actuated to advance the primary blade 18 towards the opposite side of the casing. After advancing about half way the primary blade 18 contacts the flange 28 of the secondary blade 24 and carries the latter therewith to the end of the advance movement. This brings the apertures 26 of the secondary blade 24 into registry with the lenses 8 and the apertures 37. As the primary blade approaches the end of its advance movement lug 20 contacts and presses the resilient arm 74 out of the way until the lug 20 passes behind the end 76 of the arm which then immediately springs into the path of the lug 20 and thus holds the primary blade stationary. When the operator is ready to expose the film the manual member 64 is pressed downward to carry the arm 74 below the lug 20 to release the same, whereupon the spring 52 instantly returns the primary blade to normal position. The operator then permits the spring 72 to raise the member 64 to normal position. In its return movement the primary blade 18 carries its apertures 22 into registery with the lenses 8 and the apertures 26 of the secondary blade 24 to make the exposure, and at the same instant contacts the flange 30 and restores the secondary blade 24 to normal position. The speed at which the blades are returned to normal position can be varied by adjusting the tensioning bar 54 backward or forward to change the tension of spring 52, as desired. Thus the timing of exposures can be increased or decreased.

When it is desired to make a time exposure of the film the foregoing procedure is followed until the lug 20 of the primary lever engages the end 76 of the arm 74, whereupon the presser-arm 80 is pulled outward to carry its curved end 81 into engagement with the spring member 78 to force the upper end thereof into the path of the lug 20. The manual member 64 is then pressed downward to release the lug 20 from the end 76 of arm 74, whereupon the primary blade is immediately moved backward towards normal position through the action of spring 52. In its backward movement the blade 18 carries its apertures 22 into registry with the lenses 8 and the apertures 26 and 37, and in the same instant is checked by the lug 20 contacting the spring member 78. The time exposure is then effected, after which the presser-arm 80 is pushed inward to permit spring member 78 to spring out of the path of the lug 20, so that the blades 18 and 24 can be instantly returned to normal position by action of the spring 52.

If a more simple form of the invention is desired the link 40, the tensioning bar 54, the manual member 64, the spring arm 78 and the presser bar 80 may be dispensed with. The lever 38 may then be shifted to the left and extended to engage the pivot 50 so that when the lever 38 is actuated to advance the blade 18 the lower end of the lever 38 will describe an arc and slip over the pivot 50 as said blade 18 reaches the end of its forward movement. The blade 18 may then be immediately returned to normal position by a retractile spring connected at one end to the blade and at its opposite end to the left end of frame 36. When the lever 38 is released by the operator it is instantly returned to normal position by the spring 52, one end of which may be connected to the pin 62. As the lower end of the lever 38 is swung backward by the action of the spring 52 it contacts the pivot 50, but being provided with a beveled end it is sufficiently resilient to pass the same and get in position to again advance the blade 18. The blade 24 will be controlled by the blade 18 in the same manner as heretofore described.

While the blades in the present instance are shown to slide longitudinally, they can, instead, be made to work laterally or oscillate upon an axis, and the primary blade would control the secondary blade in substantially the same manner as hereinbefore described. We also reserve the right to make such other changes as properly fall within the scope of the invention as claimed.

Having thus described our invention, what we claim and desire to secure by Letters Patent is:

1. A stereoscopic camera comprising a casing having a pair of spaced lenses in its front wall, a dark box in said casing, a pair of dark compartments in said casing, means in the dark compartments for positioning a sensitive film for exposure in the focus of each lens, means for advancing the film after each exposure, a shutter mechanism in front of the dark compartments comprising a primary blade and a secondary blade each provided with a pair of apertures spaced to register with the lenses, said blades being normally positioned to cover the lenses, guide means in the casing for the blades, manual means for advancing the primary blade past the lenses while the secondary blade remains stationary, means whereby the advancing primary blade after moving part way engages and moves the secondary blade until the apertures thereof register with the lenses, means for holding the primary blade in advanced position preparatory to making an instantaneous exposure of the film, means for disengaging the holding means from the primary blade, means for returning the primary blade to normal position when released from the holding means, exposure of the film being effected when the apertures of the primary blade register with the lenses and the apertures of the secondary blade during the return movement, and means whereby the secondary blade is returned to normal position with the primary blade.

2. A stereoscopic camera comprising a casing having a pair of spaced lenses in its front wall, a dark box in said casing provided with a pair of dark compartments one behind each lens, means for positioning a sensitive film across the rear ends of the dark compartments for exposure in the focus of the lenses, a shutter mechanism comprising a primary blade and a secondary blade, each provided with a pair of apertures spaced to register with the lenses, a frame closing the front of the dark box and in which the blades are operably mounted, said frame having a pair of apertures spaced to register with the lenses, manual means for advancing the primary blade independently of the secondary blade to carry the apertures of the former ahead of the apertures of the latter and past the lenses, means projecting from the secondary blade into the path of the primary blade whereby the later after moving part way moves the secondary blade to the end of the advance movement to carry the apertures thereof into registry with the lenses, means for engaging and holding the primary blade in advanced position preparatory to making an instantaneous exposure of the film, means for returning the primary blade to normal position when released by the holding means, exposure of the film being effected when the apertures of the primary blade are carried into registry with the lenses and the apertures of the secondary blade, and means projecting from the secondary blade into the path of the primary blade whereby the former is returned by the latter.

3. A stereoscopic camera comprising a casing provided with a pair of spaced lenses in its front wall, a pair of dark compartments in said casing, means in the dark box to position a sensitive film for exposure in the focus of each lens, a shutter mechanism comprising a primary blade and a secondary blade operably mounted in front of the dark box and each provided with a pair of apertures spaced to register with the lenses, a lever for advancing the primary blade independently of the secondary blade to carry the apertures of the latter and past the lenses, means whereby the advancing primary blade engages and moves the secondary blade until the apertures thereof register with the lenses, means cooperating with the lever for returning the primary blade to normal position, means for intercepting the returning primary blade when its apertures register with the apertures of the secondary blade and the lenses to effect a time exposure of the film, manual means for forcing said intercepting means into the path of the primary blade or for permitting the intercepting means to move out of the path of the primary blade so the same can complete its return movement, and means whereby the secondary blade is returned by the primary blade.

4. A stereoscopic camera comprising a casing with a pair of spaced lenses in its front wall, a pair of dark compartments, means in the dark compartments for positioning a sensitive film for exposure in the focus of each lens, a shutter mechanism comprising a primary blade and a secondary blade, each having a pair of apertures spaced to register with the lenses, said blades being normally positioned with one pair of apertures in registry with the other pair and both pairs out of registry with the lenses, guide means for the blades interposed between the dark compartments and the lenses, a lever for advancing the primary blade independently of the secondary blade to carry the apertures of the former ahead of the apertures of the latter and past the lenses, means whereby the primary blade after moving part way engages and moves the secondary blade therewith to the end of the advance movement to carry the apertures of the secondary blade into registry with the lenses, means for holding the primary blade in advanced position preparatory to exposure of the film, means cooperating with the lever to return the primary blade to normal position when released by the holding means, spring means for intercepting the primary blade on its return movement as its apertures are carried into registry with the apertures of the secondary blade and the lenses to effect a time exposure of the film, manual means for forcing said intercepting means into the path of the primary blade or for permitting the intercepting means to release the primary blade so that the same can complete its return movement, and means whereby the secondary blade is returned to normal position with the primary blade.

5. A stereoscopic camera comprising a casing having a pair of spaced lenses, a dark box divided into two compartments, means in said dark box for positioning a sensitive film in the focus of each lens, tracks arranged in the casing between the dark box and the lenses, a shutter mechanism comprising a primary blade and a secondary blade adapted to traverse the respective tracks and each provided with a pair of apertures spaced to register with the lenses, said blades being normally positioned to cover the lenses, manual means for advancing the primary blade independently of the secondary blade to carry the apertures of the former ahead of the apertures of the latter and past the lenses, means whereby the primary blade after advancing part way advances the secondary blade to bring its apertures into registry with the lenses, means for returning the primary blade towards normal position while the secondary blade remains stationary, exposure of the film being effected as the apertures of the primary blade are carried into registry with the lenses and the apertures of the secondary blade, and means whereby the secondary blade is returned to normal position by the primary blade.

6. In a stereoscopic camera comprising a casing with a pair of spaced lenses, means in the casing for positioning a sensitive film in the focus of the lenses, a primary blade and a secondary blade slidably mounted in the casing and positioned between the lenses and the film, each blade having a pair of apertures spaced to register with the lenses, manual means for advancing the primary blade while the secondary blade remains stationary to allow the apertures of the former to move ahead of the apertures of the latter, means whereby the primary blade advances the secondary blade until its apertures register with the lenses, means for returning the primary blade towards normal position while the secondary blade remains stationary, and means whereby the secondary blade is returned to normal position with the primary blade when the apertures of the latter register with the apertures of the former and the lenses during the return movement.

7. In a stereoscopic camera having a casing provided with a pair of spaced lenses, means in said casing for positioning a sensitive film in the focus of the lenses, a shutter mechanism comprising a primary blade and a secondary blade operably mounted in the casing and positioned between the lenses and the film, each blade having a pair of apertures spaced to register with the lenses, a lever for advancing the primary blade while the secondary blade remains stationary to allow the apertures of the former to move ahead of the apertures of the latter, means whereby the primary blade advances the secondary blade to carry the apertures thereof into registry with the lenses, spring means for returning the primary blade towards normal position while the secondary blade remains stationary until the apertures of the former register with the lenses and the apertures of the secondary blade to effect exposure of the film, and means whereby the secondary shutter is returned to normal position with the primary shutter.

8. In a stereoscopic camera having a casing provided with a pair of spaced lenses, means in said casing for positioning a sensitive film in the focus of the lenses, a shutter mechanism comprising a primary blade and a secondary blade operably mounted in the casing and positioned between the lenses and the film, each blade having a pair of apertures spaced to register with the lenses, a lever for advancing the primary blade while the secondary blade remains stationary to allow the apertures of the former to move ahead of the apertures of the latter and past the lenses, means whereby the primary blade advances the secondary blade until its apertures register with the lenses, a coil spring for returning the primary shutter towards normal position while the secondary blade remains stationary until the apertures of the former register with the lenses and the apertures of the secondary blade to effect exposure of the film, an adjustable arm for regulating the tension of said spring, and means whereby the secondary blade is returned to normal position by the primary blade instantly after the apertures of the latter register with the apertures of the former and the lenses.

9. In a stereoscopic camera having a casing with a pair of spaced lenses, means in said casing for positioning a sensitive film in the focus of the lenses, a primary blade and a secondary blade slidably mounted in the casing, each blade having a pair of apertures spaced to register with the lenses, manual means for advancing the primary blade while the secondary blade remains stationary to allow the apertures of the former to move ahead of the apertures of the latter, means projecting from the secondary blade whereby the same is advanced by the primary blade until its apertures register with the lenses, means for returning the primary blade towards normal position while the secondary blade remains stationary until the apertures of the former register with the lenses and the apertures of the secondary blade to effect exposure of the film, and means projecting from the secondary blade whereby the same is returned to normal position by the primary blade when the apertures of the latter register with the apertures of the former during the return movement.

10. In a stereoscopic camera having a casing with dark compartments and a pair of spaced lenses, means in said casing for positioning a sensitive film in the focus of the lenses, a primary shutter blade and a secondary shutter blade slidably mounted in the casing and positioned between the lenses and the film, each blade having a pair of apertures spaced to register with the lenses, manual means for advancing the primary blade while the secondary blade remains stationary until the apertures of the former move ahead of the apertures of the latter and past the lenses, means whereby the primary blade advances the secondary blade until its apertures register with the lenses, a member having means for engaging and holding the primary blade stationary when the apertures of the secondary blade are in registry with the lenses, said member being adapted to be manually actuated to disengage the engaging means thereof from the primary blade, means for returning the primary blade towards normal position when released while the secondary blade remains stationary until the apertures of the former register with the apertures of the latter and the lenses to effect exposure of the film, and means whereby the secondary blade is returned to normal position with the primary blade when its apertures register with the apertures of the latter and the lenses.

11. In a stereoscopic camera comprising a casing having a pair of spaced lenses in its front wall, a primary blade and a secondary blade slidably mounted in the casing and having apertures spaced to register with the lenses, manual means for advancing the primary blade to carry its apertures past the lenses, means whereby the secondary blade is advanced by the primary blade to carry the apertures of the former into registry with the lenses, means for automatically returning said manual means and the primary blade to normal position, a resilient member for intercepting the primary blade when its apertures register with the apertures of the secondary blade and the lenses during the return movement, a presser-arm for forcing said resilient member into the path of the primary blade, and means whereby the secondary blade is returned to normal position by the primary shutter when the resilient member releases the latter.

ARTHUR RINGER.
ORRIN C. LOWE.